United States Patent [19]

Fernandez

[11] Patent Number: 4,875,143

[45] Date of Patent: Oct. 17, 1989

[54] ROTATING LIGHT CIRCUIT AND SPEAKER COVER

[76] Inventor: Robert Fernandez, 1345 NW. 130th St., North Miami, Fla. 33167

[21] Appl. No.: 306,462

[22] Filed: Feb. 6, 1989

Related U.S. Application Data

[63] Continuation-in-part of Ser. No. 76,898, Jul. 23, 1987, abandoned.

[51] Int. Cl.$^4$ .............................................. F21V 33/00
[52] U.S. Cl. ...................................... 362/86; 362/234; 362/253; 362/806
[58] Field of Search .................. 362/86, 811, 234, 253, 362/806; 84/464; 381/124

[56] References Cited

U.S. PATENT DOCUMENTS

| 1,790,903 | 2/1931 | Craig | 84/464 |
| 2,297,907 | 10/1942 | Miller | 362/811 |
| 2,501,368 | 3/1950 | Sassin | 362/253 |
| 3,540,343 | 11/1970 | Rifkin | 84/464 |
| 3,858,797 | 5/1975 | Booty et al. | 84/464 |
| 4,176,581 | 12/1979 | Stuyvenberg | 362/806 |
| 4,264,845 | 4/1981 | Bednarz | 362/806 |
| 4,389,598 | 6/1983 | Smith | 362/811 |

FOREIGN PATENT DOCUMENTS

| 2922090 | 12/1980 | Fed. Rep. of Germany | 362/234 |
| 2379973 | 2/1977 | France | 84/464 |
| 126398 | 7/1984 | Japan | 381/124 |
| 259086 | 12/1985 | Japan | 381/124 |
| 1248821 | 10/1971 | United Kingdom | 84/464 |
| 2155797 | 10/1985 | United Kingdom | 84/464 |

OTHER PUBLICATIONS

Elecktor Publishers, Disco Lights, 9/75, vol. 1, No. 6, pp.924–926, author–Anon.

Primary Examiner—Ira S. Lazarus
Assistant Examiner—Sue Hagarman
Attorney, Agent, or Firm—Robert J. Van Der Wall

[57] ABSTRACT

There is provided a vehicular after market accessory suitable for replacing the original equipment cover for an audio speaker. The accessory customizes the vehicular audio system by the addition of lights. Lighting means are disposed in a series of discrete locations about the circumference of the pre-existing audio speaker, each of which are in electrical communication with a circuit designed to illuminate said means in sequence to create the effect of light moving about the circumference of the speaker. The circuit design is independent of audio output, and is such that two individual lighting means on opposite sides of the circumference are illuminated at any moment in time and are extinguished as the next lighting means adjoining them are illuminated, thereby creating the effect of two lights rotating about the circumference of the speaker directly opposite each other and in the same direciton. Each of the lights appear to chase each other. The speed of rotation, and the intensity of the illumination both bear no relationship to the audio output.

18 Claims, 4 Drawing Sheets

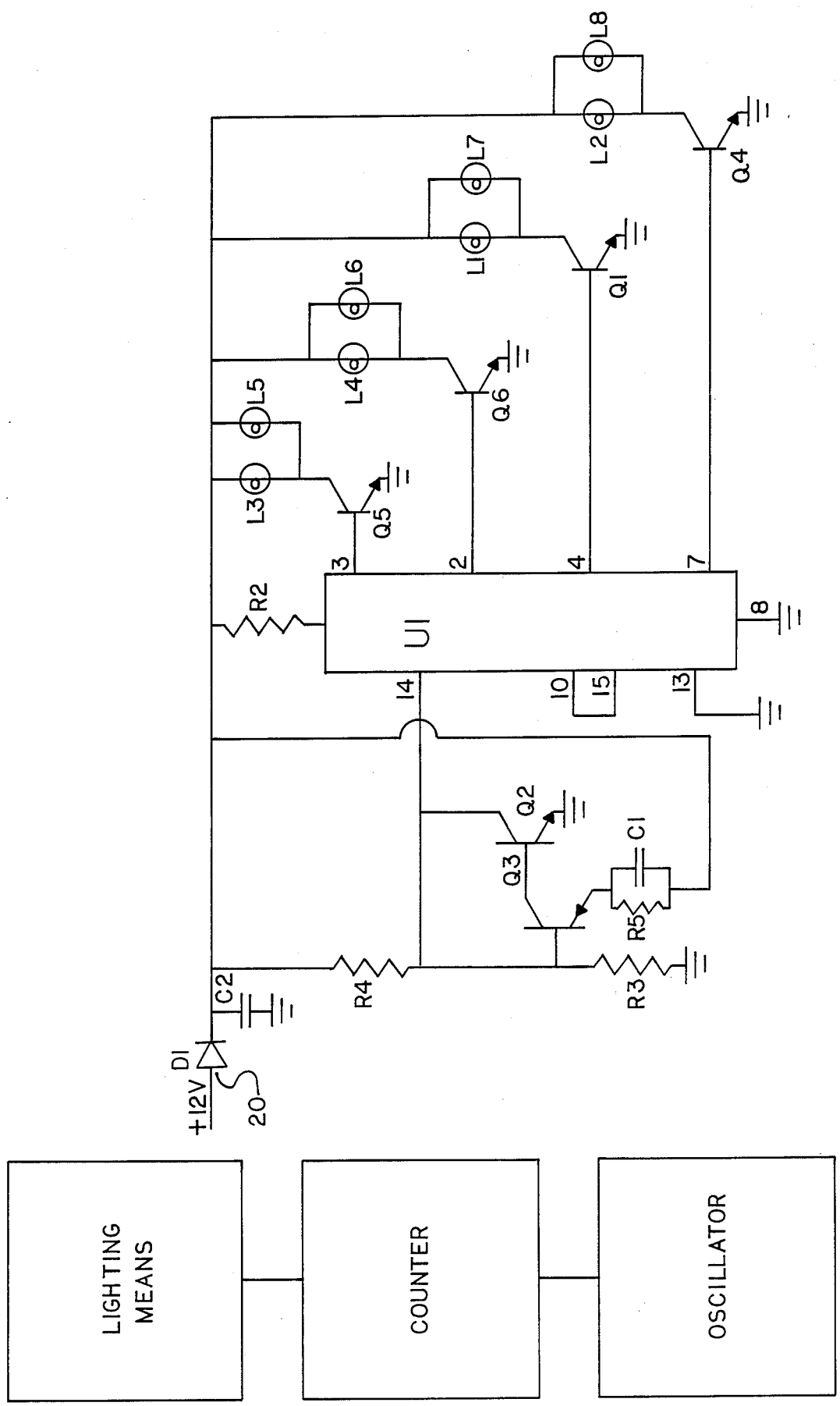

ROTATING LIGHT CIRCUIT AND SPEAKER COVER

CROSS REFERENCE TO RELATED APPLICATION

This application is a continuation-in-part and was co-pending with Applicant's earlier filed parent application, Serial No. 07/076,898 filed on July 23, 1987, now abandoned. It claims the filing date of the parent application for all subject matter in common with said parent application.

FIELD OF THE INVENTION

The present invention generally relates to the field of automotive accessories, and specifically concerns a simplified circuit in combination with an automotive speaker cover adapted for use therewith to allow at least a portion of light generated in a particular pattern to pass through the material from which the cover is made.

BACKGROUND OF THE INVENTION

The original development of the automobile as a means of transportation was understandably focused upon the solution of a plethora of physical and mechanical problems associated with perfection of the machine's capability, function, convenience, durability, flexibility and the like. Throughout this development, part of the effort has been directed to diversification of the vehicle itself, which has led to four-wheel drive vehicles, recreational vehicles, dune buggies, tractor trailer trucks, forklift trucks, tractors, etc. Even today, the principal concern of some automotive designers who are now more directed to matters of aesthetics and style, must be limited to that which will have broad based appeal to the mass market. There is thus left to others the design of vehicle accessories that serve to customize a substantially standardized mass market product.

The American vehicle market clearly remains the largest in the world, and is made up of people who pride themselves in their individualism and possess sufficient disposable income to customize their vehicles at sometimes substantial expense according to their tastes and social environment. This, in turn, has led to the development of a large vehicle accessory aftermarket aimed at those who seek to individualize their vehicles with accessories that are relatively novel compared to the substantially standardized mass market product offered by the vehicle manufacturers.

One goal of the vehicle accessory aftermarket designer is to adapt new developments in other fields to use in or with vehicles. This often necessarily involves simplification or miniaturization because of the size, weight, space or other limitations imposed by vehicular use. The present invention involves just such simplification. Prior art devices from other fields of use of the type here disclosed are complex, unnecessarily flexible, expensive, and inappropriate to use within an automobile or similar vehicles because of safety considerations and legal prohibitions. And, while a changed use of a known structure does not normally provide grounds for patentability, simplification of prior art devices certainly does provide such grounds.

The present invention comprises a cover to be used over a pre-existing vehicular speaker such as employed with radio, cassette tape, or compact disc sound systems that are normally already installed in the vehicle. In any event, the present invention is to be added to such systems and does not include the speaker itself, contrary to most of the prior art. Integral with the cover of the present invention are a very simple circuit and a series of lights illuminated in a certain sequence by the circuit, in which lighting means are preferably visible through the material from which the cover is made only when illuminated. The principal element of the cover structure is a frame circumscribing the speaker itself, which is preferably fabricated from a translucent material through which the light emitted is at least in part transmitted, but which hides the lighting means as well as their mountings and the miniature circuit disposed in the frame. The sequence in which the lights are illuminated and the intensity of the illumination, are not flexible, being fixed by the circuit and independent of sound related parameters such as amplitude or frequency. That is, illumination of the lights is not affected in any respect by the sound passing through the speaker or its volume. These are significant facts because traffic laws in most states prohibit brightly flashing lights visible from the vehicle exterior, and safety considerations require that decorative or novelty lighting must not interfere with visibility, particularly for night driving when the potential for interference is the greatest.

Lighting means in the present invention may be low intensity light bulbs, light emitting diodes, or the like which are disposed in a series of discrete locations about the circumference of the speaker. Each of the lighting means are in electrical communication with the circuit which is designed to illuminate the lighting means in sequence to create the effect of light moving about the circumference of the speaker. The circuit design is such that two individual lighting means on opposite sides of the circumference are illuminated at any given moment in time and are extinguished as the next lighting means adjoining them are illuminated, to create the effect of two lights rotating about the circumference of the speaker, directly opposite each other, but in the same direction. The speed of rotation is fixed by the circuit and bears no relationship to sound emanating from the speaker. These and other characteristics of the invention described herein differ significantly from the prior art as will be seen from the following discussion.

Prominent among the several prior art references that combine speakers with lights is the disco light assembly patented by Smith, U.S. Pat. No. 4,389,598, which allows illumination of a multiplicity of individual electric lamps formed in any appropriate configuration and which are illuminated in any desired sequence in response to a disco beat. This reference includes ten (10) drawing figures, most of which involve circuit diagrams of considerable complexity, and consequent expense. One interesting feature of this reference is the provision for placing the electric lamps in a ring configuration which can be controlled so that the effect of a single lamp traveling around the ring at high speed can be produced with no mechanical motion. This one feature of the Smith reference bears similarity to the present invention, although two (2) opposing points of light are utilized with the present invention, but the Smith invention is extremely complex, and is, therefore, inappropriate for vehicular use for the reason above-described. The disclosure is also for a plurality of other purposes inappropriate to vehicular use and is extremely expensive when compared to the present invention. See, for example, FIG. 10 thereof.

Another reference of some interest is British Pat. No. 2,155,797 A by Liano for a loud speaker with light emitting means. It should be noted at the outset, that although the present invention is intended for use with the speaker, it does not include the speaker which must be preexisting. The present invention is more in the nature of a speaker cover with included circuit that is a retrofit, since it is functionally independent of the speaker. The application of Liano is one of numerous prior art inventions which coupled the speaker audio signal to the illumination output. These devices are frequently used in disco applications so that light and sound are emitted in a predetermined relationship. Another distinction with the application of Liano is that the present invention utilizes a far more simplified circuit than does Liano and that circuit is mounted on the retrofitable speaker cover so that it is readily separable from the speaker itself.

A further example of this type of device coupling visual and audible output is that taught by British Pat. No. 1,248,821 issued to Phillips, concerning an entertainment device. The latter reference teaches an apparatus which reproduces sound electrically and utilizes electrical impulses accompanying such reproduction to achieve animation of light reflecting objects onto which a light beam is projected, whereby moving reflections from such moving or animated objects are formed on a surface such as a screen, a wall of a room, or any other suitable medium. A visual representation of the tempo of the music is presented thereby.

Another such device is taught by Nakamatsu, Japanese Pat. No. 60-259086(A) for rainbow lighting equipment in which a display section lighting with luminescence and color depends on the sound volume and sound quality produced.

An early version of the coupling of sound producing apparatus in combination with lighting is contained in a disclosure of Craig, U.S. Pat. No. 1,790,903, which teaches the coupling of a radio loudspeaker with correspondingly colored lights displayed to the listeners.

Another such disclosure is in French Pat. No. 78 02603, issued to Jaeger which is housed in a loudspeaker cabinet and is provided with a number of lamps, the current to which is varied in accordance with recorded sounds to give a variety of visual decorative effects.

A further reference is an article concerning disco lights described in a British publication, Elektor, dated September 1975, Volume 1, No. 6, pp 924-926, which describes psychedelic flashing light displays using logic shift registers. The circuits in this device are also more complex than that disclosed in the present invention and the sequencing of the lights is completely different than that of the present invention.

Two other references of even lesser relevance are U.S. Pat. No. 2,501,968 to Sasson which describes a speaker and light in a common structure for installation in the ceiling of a car, but with the light being simply a dome light having no relevance to the sound and not flashing, and U.S. Pat. No. 2,297,907 issued to Miller which is for an illuminated cabinet of the type adapted for a jukebox.

None of the foregoing references either individually or in any combination teach the structure of the present invention whose beauty is in its simplicity.

Bearing in mind the foregoing, it is a principal object of the invention to provide a rotating light circuit and speaker cover which can be added to a pre-existing speaker as a decorative accessory to a vehicle.

A related object of the invention is to provide such an accessory which customizes the interior of a vehicle in a unique way without violating safety laws concerning flashing lights or impairing visibility.

Another object of the invention is to provide a vehicular speaker cover which contains a circuit disposed therein to eliminate considerations of placement of such a circuit, thereby simplifying it and standardizing installation.

A further object of the invention is to provide a rotating light circuit and speaker cover that is inexpensive to manufacture and reliable in use.

One more object of the invention is to provide such a vehicular accessory which includes two rotating points of light opposed to each other, the rotational speed of which is fixed by the circuit and independent of audio output.

A related object of the invention is to achieve the preceding object with light frequency and intensity that is also independent of audio output from the speaker.

An additional object of the invention is to provide a vehicular accessory in the form of a speaker cover that creates a rotating light effect, but wherein the lighting means are disposed within the cover and are not visible except when each such lighting means are illuminated as a consequence of the cover being fabricated from a translucent material.

A further object of the invention is to provide a rotating light circuit and speaker cover which provides the attractiveness of the addition of lighting effects to sound output, such as used in disco applications, but with the lighting output independent of the sound output and with minimal expense.

Other objects and advantages of the present invention will be apparent to those skilled in the art upon review of the following descriptions, the accompanying drawings, and appended claims.

SUMMARY OF THE INVENTION

In accordance with a principal aspect of the invention there is provided a vehicular after market accessory suitable for replacing the original equipment cover for an audio speaker which accessory customizes the vehicular audio system by the addition of lights. Lighting means are disposed in a series of discrete locations about the circumference of the pre-existing audio speaker, each of which are in electrical communication with a circuit designed to illuminate said means in sequence to create the effect of light moving about the circumference of the speaker. The circuit design is independent of audio output, and is such that two individual lighting means on opposite sides of the circumference are illuminated at any moment in time and are extinguished as the next lighting means adjoining them are illuminated, thereby creating the effect of two lights rotating about the circumference of the speaker directly opposite each other and in the same direction. Each of the lights appear to chase each other. The speed of rotation, and the intensity of the illumination both bear no relationship to the audio output. The speaker cover includes as a prominent feature a frame which contains both the lighting means and the miniaturized and simplified circuit which drives the lighting means to achieve the desired aesthetic effect. This frame is preferably fabricated from a translucent material which hides the lighting means, the supports for same, and the circuit components, only transmitting a portion of light emitted by the lighting means as each of said lighting means is illuminated in turn and in opposed pairs.

The circuit is greatly simplified from those utilized in prior art devices. It essentially includes three basic portions. These are a timing or clock device, preferably an oscillator, a counter that switches each of a plurality of lighting means on and off in sequence, and a plurality of the lighting means. This circuit is readily mountable within the frame of the speaker cover to make the resulting product readily adaptable for use with any standard size vehicular audio speaker. A more definitive explanation of the present invention is available by reference to the following detailed description and upon reference to the drawings in which:

BRIEF DESCRIPTION OF DRAWINGS

FIG. 6 shows the three basic elements of the simplified and miniaturized circuit of the present invention which, in part, distinguishes it from the prior art.

FIG. 7 is a schematic diagram of the preferred circuit described in general by FIG. 6.

DETAILED DESCRIPTION OF THE PREFERRED EMBODIMENTS

Figure 1:
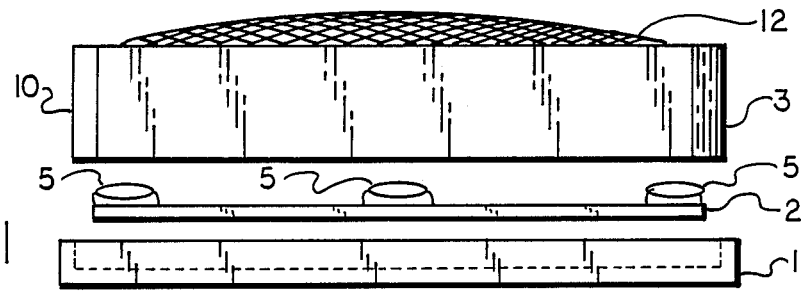
FIG. 1 is an exploded end elevation view of a preferred embodiment of the invention showing the speaker cover, printed circuit board and bottom shield.

FIG. 1 illustrates an exploded end elevation view, of a speaker cover 3 comprised generally of a frame 10 circumscribing a grid 12 which is permeable to an audio signal that emanates from a pre-existing speaker (not shown). The frame 10 is, of course, attached to the periphery of the grid 12 and is preferably fabricated from a translucent plastic material. It is superimposed above a printed circuit board 2 on which are mounted a plurality of lighting means 5. The nature of the circuit contained on printed circuit board 2 along with other components related thereto will be described in regard to subsequent figures. Also shown in regard to FIG. 1 is a bottom shield 1 which, in practice, is attached to the bottom of cover 3 to contain printed circuit board 2.

Figure 2:
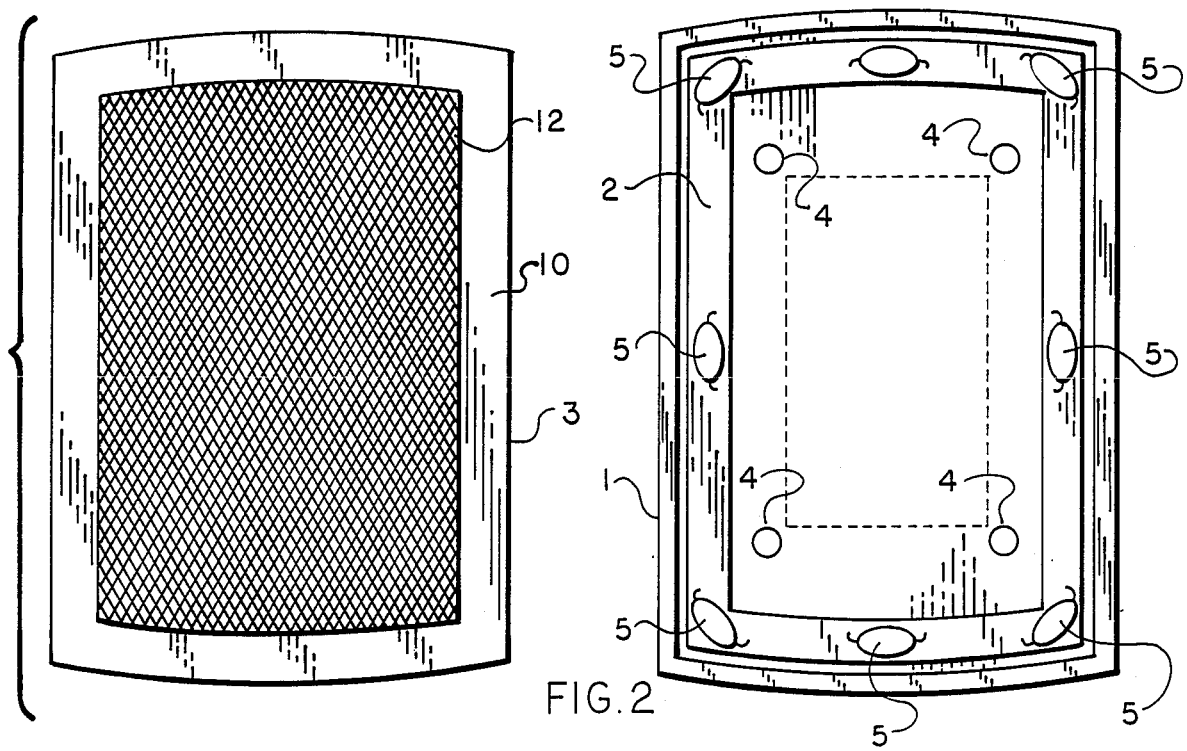
FIG. 2 shows an enlarged, partially exploded perspective view of the preferred embodiment of the invention.

FIG. 2 shows a top partially exploded view of the preferred embodiment of the invention in which the cover 3 is shown separated from the combination of the printed circuit board 2 and bottom shield 1. It will be seen more clearly that the grid 12 is circumscribed by the frame 10. Also in FIG. 2 is shown in top view the combination of printed circuit board 2 and bottom shield 1 illustrating the disposition of a plurality of lighting means 5 about the circumference of printed circuit board 2. Also seen are a plurality of mounting means 4, preferably in the form of screw mounts, which are used to attach the invention to a preexisting speaker. This is accomplished by placing the speaker into position on the mounting surface and placing screws through the four speaker holes and then through the four corresponding mounting holes in the speaker cover, which screws are then tightened to secure the cover.

Figure 3:
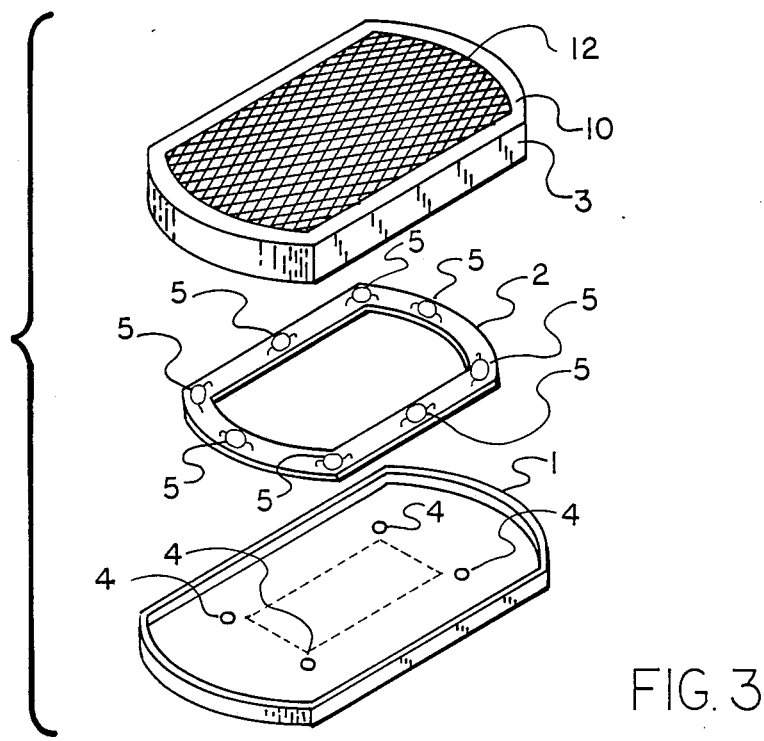
FIG. 3 is a reduced size exploded isometric view the speaker cover, printed circuit board and bottom shield.
Figure 4:
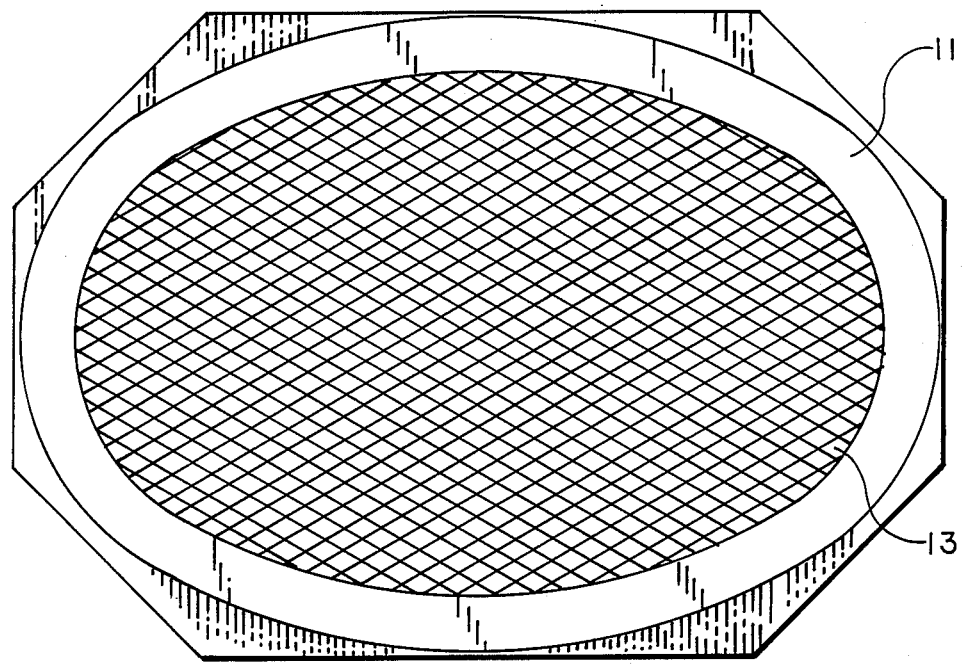
FIG. 4 illustrates that the present invention is not limited to the rectangular shape of the preferred embodiment are FIGS. 1-3, but is adaptable to oval speaker shapes.

FIG. 3 is an exploded perspective view showing the cover 3 comprised generally of frame 10 surrounding grid 12 over the top of printed circuit board 2 on which can be seen a plurality of lighting means 5. These are both atop bottom shield 1, on which are disposed a plurality of mounting means 4. FIG. 4 is a top view of an alternative embodiment of the invention which is molded to conform to a pre-existing speaker which is oval in configuration. Grid 13 is in this instance surrounded by frame 11 and other parts of the invention are correspondingly modified in shape. In the interest of brevity, each of these component parts will not be described, it being recognized that the electrical functions are substantially identical for embodiments having a different shape.

Figure 5:
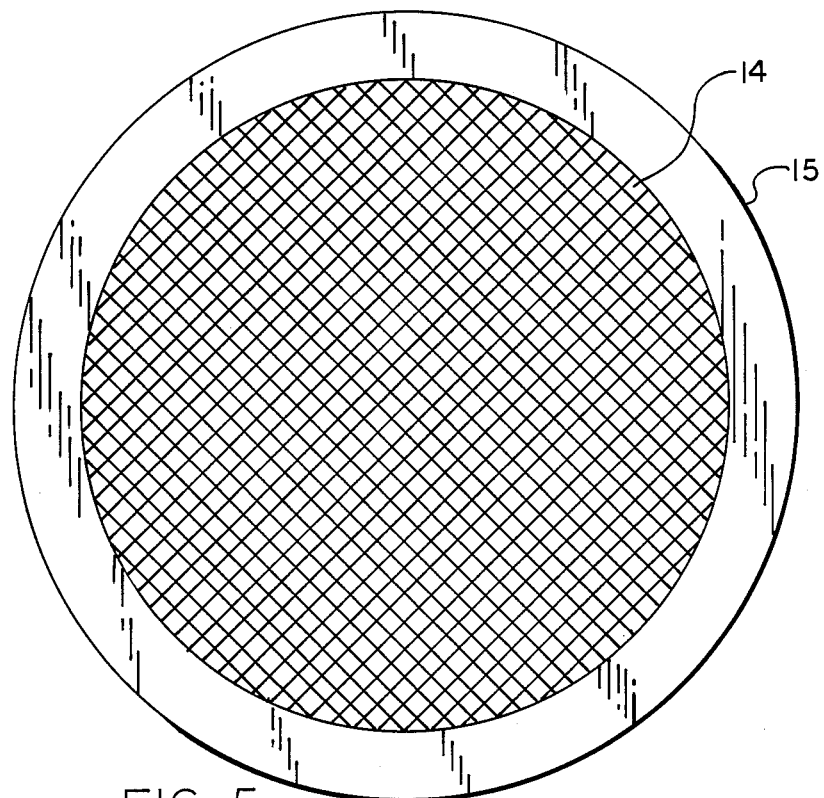
FIG. 5 serves the same purpose as FIG. 4 except to indicate adaptability of the invention to round speakers.

FIG. 5 illustrates the same principle when applied to a round speaker wherein frame 15 surrounds grid 14.

FIG. 6 is a block diagram illustrating the simplified circuit of the present invention over prior art devices of a similar type. Lighting means are in electrical communication with a counter, which in turn is in electrical communication with a clock device. The latter is typically an oscillator as illustrated in this figure, but can also be of other structures that perform the same function. In addition, a switching function is implied within the counter portion of the circuit.

More specifically, the oscillator is used to generate alternating current in the form of pulses at a frequency determined by the values of certain components in the system. These pulses are appropriate for the timing and function of the counter, which is preferably a decade counter.

The decade counter counts in sequence from state 0 to state 9 and then cycles back to 0. It achieves this cycling by the application of appropriate clock or pulse inputs, electrically communicated to it by the oscillator. It should also be noted, however, that decimal and binary counters can be substituted for the integrated circuit type counter abovedescribed. As the counter is changing output states, these outputs are communicated to a switching circuit portion of the counter which is a mechanical or electrical means that opens and closes the path of current in the device to each of a plurality of lighting means which are in electrically conductive communication with the counter. Each lighting means emits luminous energy or light and provides an appropriate lighting display, which may be in various colors, as the circuit energizes the same in sequence.

Referring now to FIG. 7, the preferred embodiment of the circuit is disclosed. Power to the circuit has a value of approximately 12 volts DC, which is the voltage source in most vehicles. This supply is seen at 20 and is delivered to the circuit at the anode side of diode D1. It is well established that a diode has a forward bias, or permits current flow when a positive voltage is delivered to the anode and a reversed bias or prohibits current flow, when a positive voltage is delivered to the cathode side of the diode. This diode is included in the circuit essentially as a protective device. In the event that the polarity of the voltage source is reversed, diode D1 restricts the reverse current flow, therefore preventing damage to the devices integrated circuit hereinafter described, and other components.

The current flowing through diode D1 when it is forward biased travels to the respective components in the circuit as can be seen in the schematic. This circuit uses an oscillator to provide a positive going clock pulse to integrated circuit U1. The active components used in the oscillator portion of the circuit are two transistors labeled Q2 and Q3.

A small positive current flows through resistor R5 to the emitter of transistor Q3. Since Q3 has a ground, or 0 volt, potential at its base at this point in time, it becomes forward biased, permitting a current flow through Q3 and resistor R3 to ground, in effect turning on transistor Q3. Once transistor Q3 is on, it allows a positive current flow from the Q3 emitter through the collector of Q3 to the base of transistor Q2. This forward biases transistor Q2, turning it on and grounding the positive voltage that exists at resistor R4 and pin 14, which is the clock input of integrated circuit U1. The current flowing through the collector of transistor Q3 to the ground at the emitter of transistor Q2 produces a negative charge on the side of capacitor C1 that is tied to the emitter of Q3. When the voltage at the emitter of transistor Q3 reaches the same voltage potential as the base of Q3, current flow stops turning off transistor Q3. This will also turn off transistor Q2, restoring pin 14 of integrated circuit U1 to its former positive state. Current then begins to flow through R5 to the negatively charged side of capacitor C1 until it is discharged.

This process then continues to repeat itself producing the positive going pulses that are needed for the clock input, pin 14, of integrated circuit U1. U1 is preferably a 4017 decade counter, having 10 outputs that go high in order, one at a time, ascending in order, one for every positive going clock pulse that is introduced to the clock input at pin 14 of U1. It should be noted that this particular usage of the 4017 decade counter only utilizes 4 of the 10 outputs, but since it is a commercially available component, the purchase and use thereof in production of the disclosed invention is economic because redesign thereof to decrease the number of outputs would amount to a significant and substantially unnecessary expense.

As the pulses continue, integrated circuit U1 begins to count from 0-3, which refers to pins 3, 2, 4, and 7 respectively. The device continues to count internally until a count of 7, which has its output pin 10 of U1 in electrical communication with a reset function at pin 15 of U1. The output at pin 10 of U1 causes its integrated circuit to reset, and begin its count again at 0.

The power pin, pin 16 of integrated circuit U1, has a current limiting resistor, resistor R2, as a safety precaution to prevent excessive current flow that could damage U1. The outputs of U1, at pins 3, 2, 4 and 7, are respectively in electrical communication with transistors Q5, Q6, Q1, and Q4. These transistors, upon receiving a high input from integrated circuit U1 to the base of each, causes current flow from the emitters to the collectors. The collectors are in electrical communication with one side of the lighting means, the other side of the lighting means being connected to the positive supply voltage to complete the circuit. Each lighting means thus has a ground potential on one side, whenever a positive going pulse from U1 turns on the transistor in question. This will cause current flow across lighting means wired together in pairs, and causes the lighting means to emit luminous energy or light. As will be seen from FIG. 7, the lighting means are arranged in pairs, wired in parallel and with numbers which represent the position of each of said lighting means at diametrically opposed physical positions about the circumference of the frame as described above.

Figure 8:
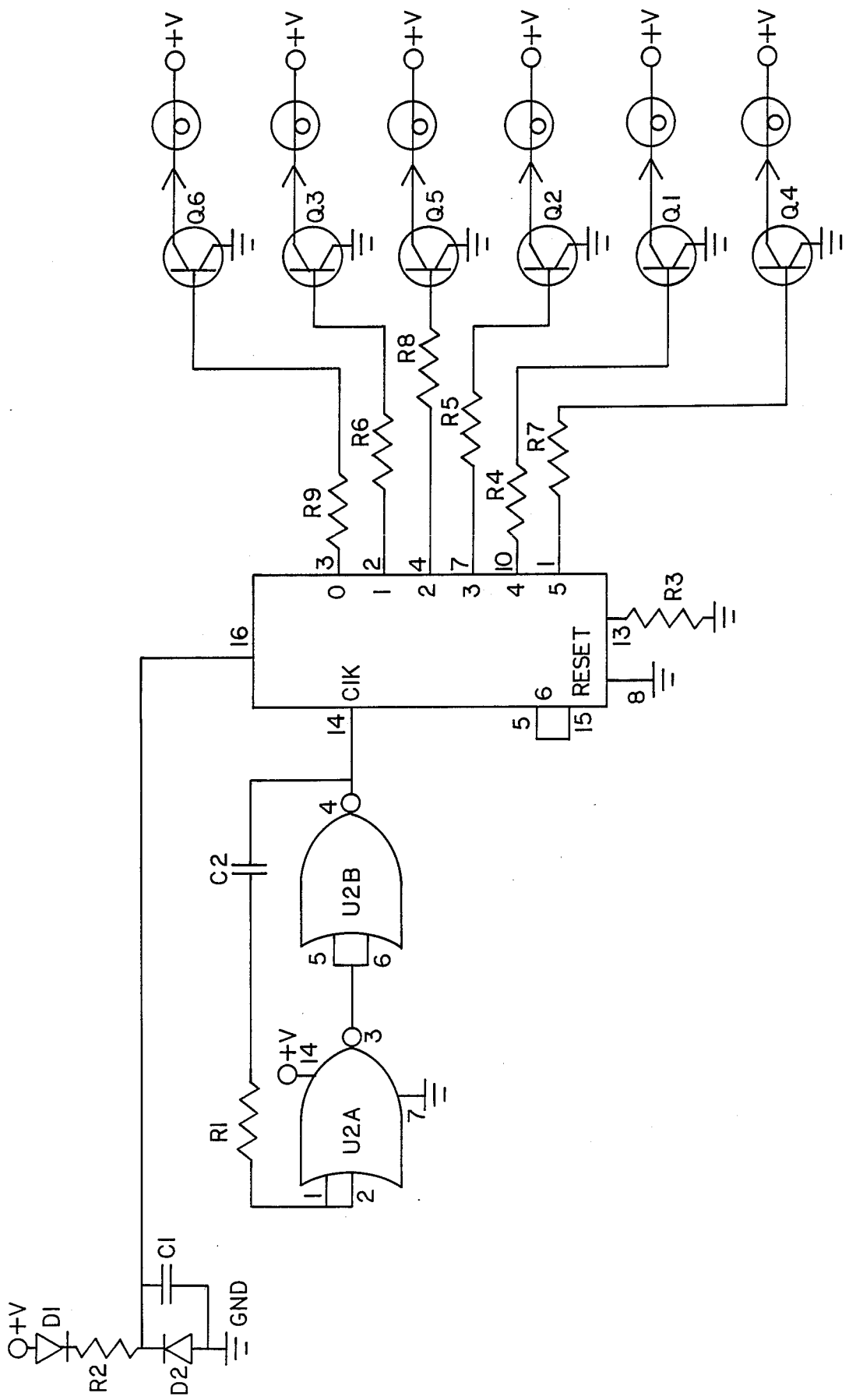
FIG. 8 is another schematic of an alternative embodiment to the circuit of FIG. 7 and serves to illustrate how differing circuits still fit within the generalized description of FIG. 6.

FIG. 8 is a schematic of an earlier, and now alternative, embodiment of the circuit of the present invention. A substantially identical circuit was disclosed in the parent application and illustrates that substitution of components can be achieved without departing from the more broadly described functional definition of the circuit in the present invention. The power source to this circuit is also 12 volts DC, and includes the protective diode D1 as described above in regard to FIG. 7.

This alternative embodiment also utilizes an oscillator to provide a positive going clock pulse to integrated circuit U1. However, the design of the oscillator section is different. The active component therein is an integrated circuit referred to generally as U2. Integrated circuit U2 is preferably a 4001 quad NOR gate of which two stages are used in conjunction with resistor R1 and capacitor C2 as a feedback oscillator. The input pins of the NOR gates are tied together, turning them in effect into invertors. This means, for example, that if a positive voltage was present at input pins 1 and 2 of U2A, it would be inverted so that the output of U2A at pin 3 would be 0 volts. Likewise, if 0 volts were present at this input, e.g., pins 1 and 2 of U2A, pin 3 would reflect the inverted output, which would be a positive voltage.

Upon applying voltage to the device, if the output of the NOR gate, stage U2A at pin 3, is low or 0 volts, stage U2B will invert it and cause a high or positive output at U2B pin 4. This positive output goes through resistor R1 and capacitor C2, producing a delay, which positive output is then fed back into the input of U2A. This process will continue to repeat itself, producing high and low pulses at pin 4 of U2B. These positive going pulses are used as the clock input at pin 14 of integrated circuit U1.

U1 is a 4017 decade counter, having 10 outputs that go high in order, one at a time, and ascending in order, one for every positive going clock pulse that is introduced at the clock input at pin 14. This particular usage of the 4017 decade counter uses only 6 of the 10 outputs in a manner similar to that described in connection with FIG. 7.

As the pulses continue, U1 will begin its count from 0-5 which refers to pins 3, 2, 4, 7, and 1 respectively. The device continues to count internally until the count of 6, which has its output at pin 5 of U1 in electrical communication with a reset function at pin 15 of U1. The positive output at pin 5 of U1 causes the integrated circuit U1 to reset, and begin its count again at 0, also in the manner described in regard to FIG. 7. The outputs of U1, pins 3, 2, 4, 7, 10, and 1 go to the bases of transistors Q6, Q3, Q5, Q2, and Q4 respectively through current limiting resistors R9, R6, R8, R5, R4 and R7 respectively. These resistors are used to protect the transistors from the current that could damage them. When these transistors receive the positive output from integrated circuit U1 to the base, it causes current to flow from the emitters which are in electrical communication with ground, to collectors which are in electrical communication with one side of the lighting means. The other side of the lighting means are connected to the positive supply voltage. The lighting means thus have a ground potential on one side wherever a positive going pulse from U1 turns on the transistor in question. This will cause current flow across the lighting means and the emission of luminous energy or light.

While the invention has been described in connection with a preferred embodiment and at least one alternative embodiment, it will be understood that there is no intention to thereby limit the invention. On the contrary, there is intended to be covered all alternatives, modifications and equivalents as may be included within the spirit and scope of the invention as defined by appended claims, which are the sole definition of the invention.

What is claimed is:

1. A rotating light circuit and speaker cover apparatus comprising:
   an audio signal permeable grid;
   a frame circumscribing and attached to a periphery of the grid;
   a plurality of lighting means in luminous energy communication with, and disposed beneath, the frame to selectively emit light at least partially transmitted through said frame;
   a counter in electrical communication with each of the lighting means to selectively energize and de-energize same in a predetermined sequence, said counter mounted in proximity to the lighting means beneath the frame;
   a clock generating electrical pulses which are electrically communicated to the counter to control timing of said counter, said clock mounted in proximity to the counter beneath the frame; and
   at least one electrical conductor to establish electrical communication between the circuit and a pre-existing power source.

2. The apparatus of claim 1 in which the clock is an oscillator.

3. The apparatus of claim 1 in which the counter is an integrated circuit decade counter which further comprises switching means.

4. The apparatus of claim 3 in which the switching means are a plurality of transistors electrically connecting the decade counter to each of the lighting means.

5. The apparatus of claim 1 in which the lighting means are light emitting diodes.

6. The apparatus of claim 1 in which the lighting means are incandescent bulbs.

7. The apparatus of claim 1 which further comprises a printed circuit board substantially conforming to a shape of the frame, mounted beneath the frame, and supporting the lighting means, counter and clock.

8. The apparatus of claim 1 which further comprises a bottom shield disposed beneath the lighting means, counter, clock and frame, said shield connected to the frame and having a plurality of mounting means for attachment of the apparatus to a pre-existing speaker.

9. The apparatus of claim 1 in which the predetermined sequence is energization and denergization of two lighting means diametrically opposed to each other simultaneously, followed by energization and denergization of two lighting means adjacent thereto and the like, without relation to audio signals from a pre-existing speaker.

10. The apparatus of claim 1 in which the frame is translucent.

11. A rotating light circuit and speaker cover apparatus, comprising:
    an audio signal permeable grid;
    a frame circumscribing and attached to a periphery of the grid;
    a plurality of lighting means in luminous energy communication with, and disposed beneath, the frame to selectively emit light at least partially transmitted through said frame;
    a counter in electrical communication with each of the lighting means to selectively energize and de-energize same in a pre-determined sequence through a plurality of transistors electrically interposed between the counter and each of the lighting means; said counter mounted in proximity to the lighting means beneath the frame;
    a clock generating electrical pulses which are electrically communicated to the counter to control timing of said counter, said clock mounted in proximity to the counter beneath the frame; and
    at least one electrical conductor to establish electrical communication between the circuit and a pre-existing power source.

12. The apparatus of claim 11 in which the clock is an oscillator.

13. The apparatus of claim 11 in which the counter is an integrated circuit decade counter.

14. The apparatus of claim 11 in which the lighting means are light emitting diodes.

15. The apparatus of claim 11 in which the lighting means are incandescent bulbs.

16. The apparatus of claim 11 which further comprises a printed circuit board substantially conforming to a shape of the frame, mounted beneath the frame, and supporting the lighting means, counter and clock.

17. The apparatus of claim 11 which further comprises a bottom shield disposed beneath the lighting means, counter, clock and frame, said shield connected to he frame and having a plurality of mounting means for attachment of the apparatus to a pre-existing speaker.

18. The apparatus of claim 11 in which the predetermined sequence is energization and denergization of two lighting means diametrically opposed to each other simultaneously, followed by energization and denergization of two lighting means adjacent thereto and the like, without relation to audio signals from a pre-existing speaker.

* * * * *